Figure 1:
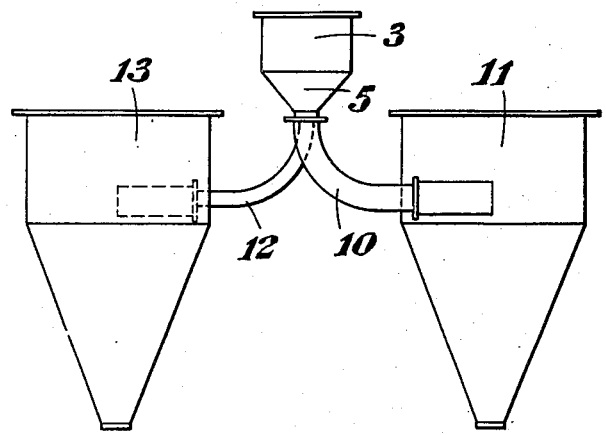

June 24, 1958 J. D. B. PHIPPS 2,840,238
SAND CLASSIFYING APPARATUS
Filed Feb. 14, 1955 10 Sheets-Sheet 1

Inventor:
John Gregory Baron Phipps
By his attorney:
Baldwin + Wight.

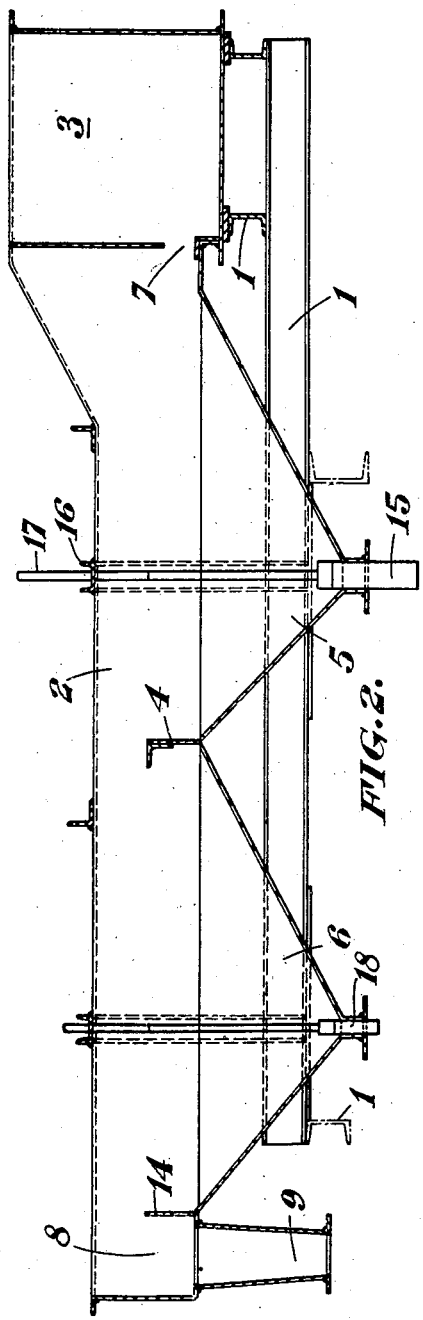

June 24, 1958
J. D. B. PHIPPS
2,840,238
SAND CLASSIFYING APPARATUS
Filed Feb. 14, 1955
10 Sheets-Sheet 3
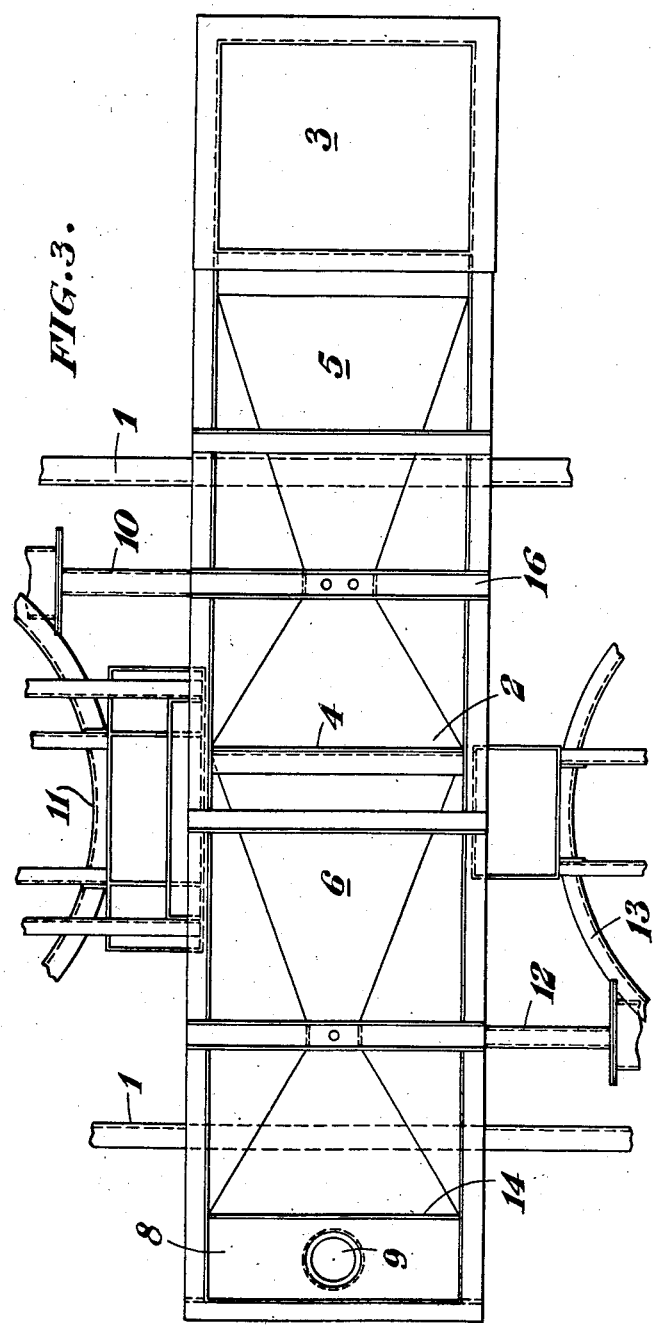

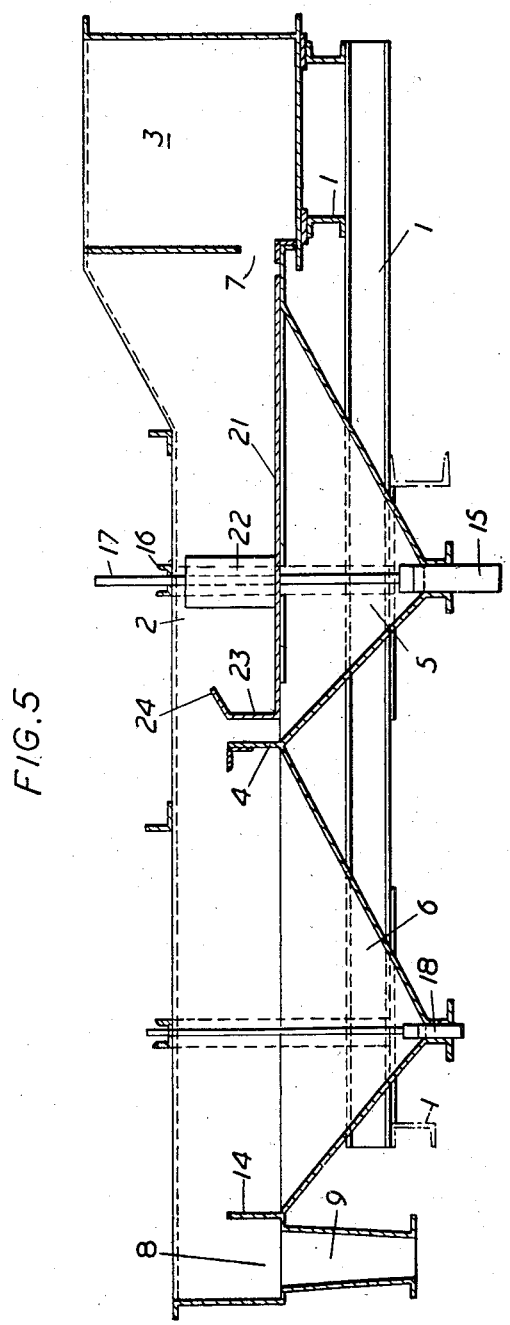

June 24, 1958  J. D. B. PHIPPS  2,840,238
SAND CLASSIFYING APPARATUS

Filed Feb. 14, 1955  10 Sheets-Sheet 5

Inventor:
John Gregory Baron Phipps
By: Baldwin + Wight
his Attorneys

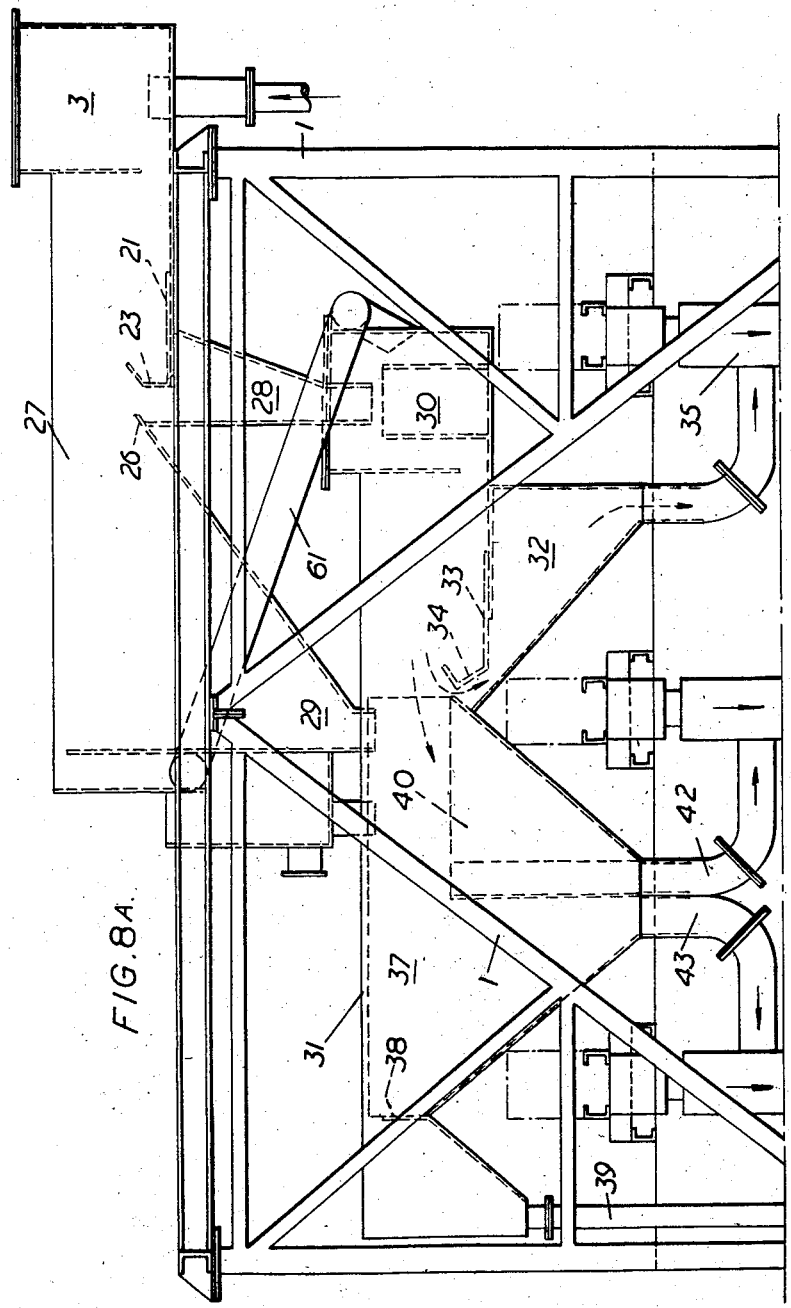

June 24, 1958 J. D. B. PHIPPS 2,840,238
SAND CLASSIFYING APPARATUS
Filed Feb. 14, 1955 10 Sheets-Sheet 7

Inventor:
John Gregory Baron Phipps
By:
Baldwin & Wight
his Attorneys

June 24, 1958 J. D. B. PHIPPS 2,840,238
SAND CLASSIFYING APPARATUS
Filed Feb. 14, 1955 10 Sheets-Sheet 8
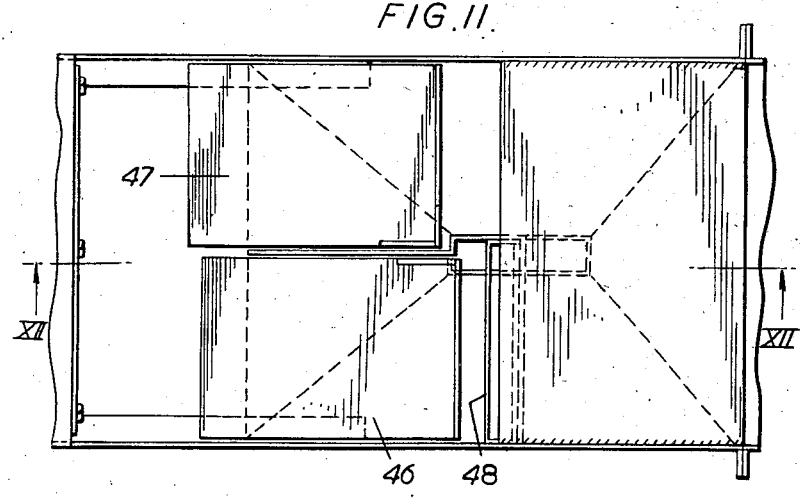
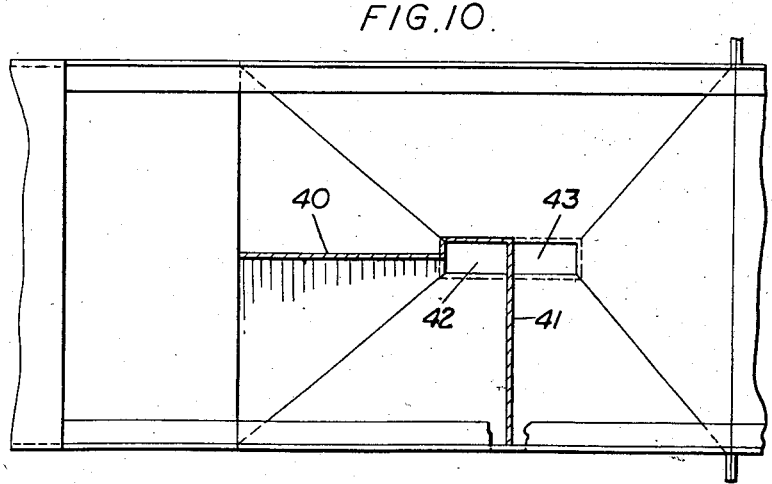
Inventor:
John Gregory Baron Phipps
By:
Baldwin & Wight
his Attorneys

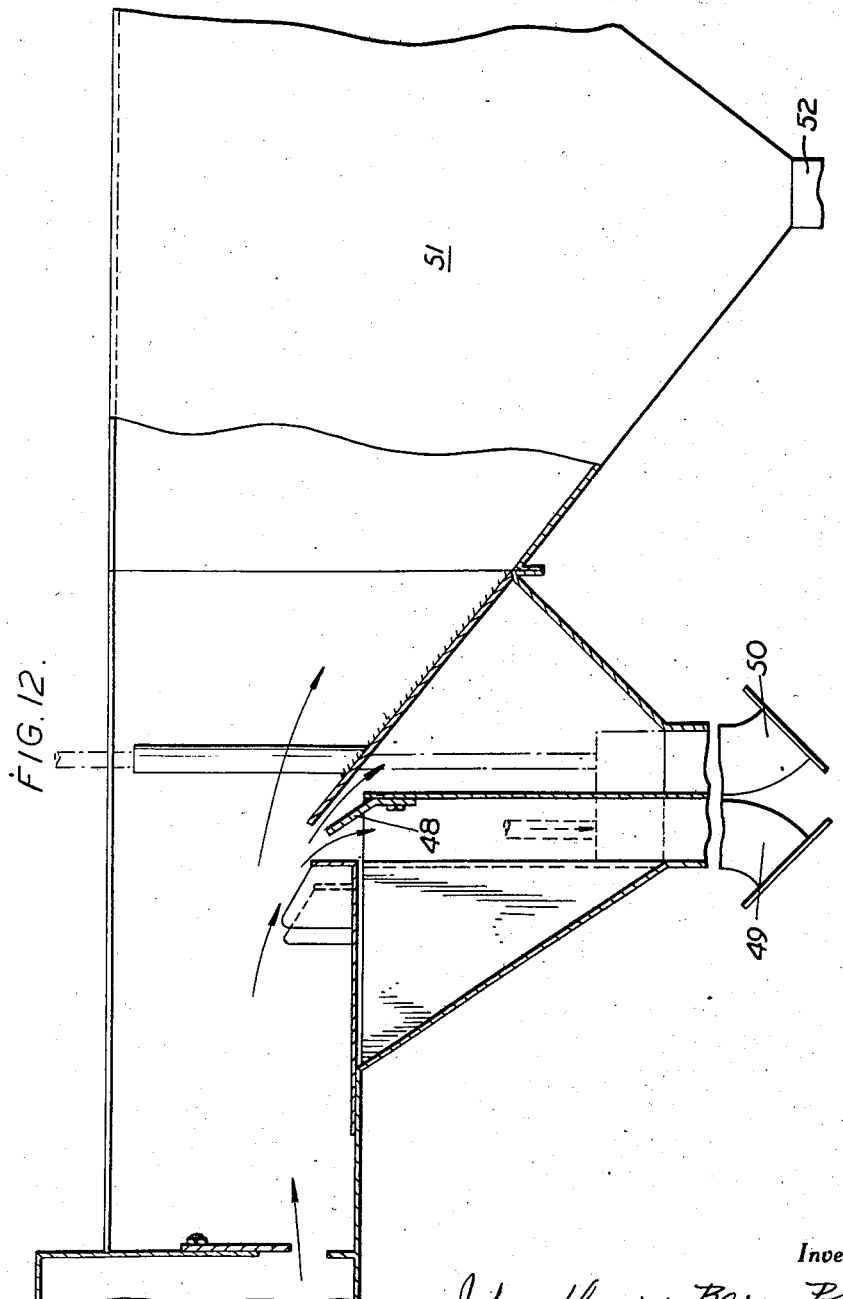

June 24, 1958 J. D. B. PHIPPS 2,840,238
SAND CLASSIFYING APPARATUS
Filed Feb. 14, 1955 10 Sheets-Sheet 10
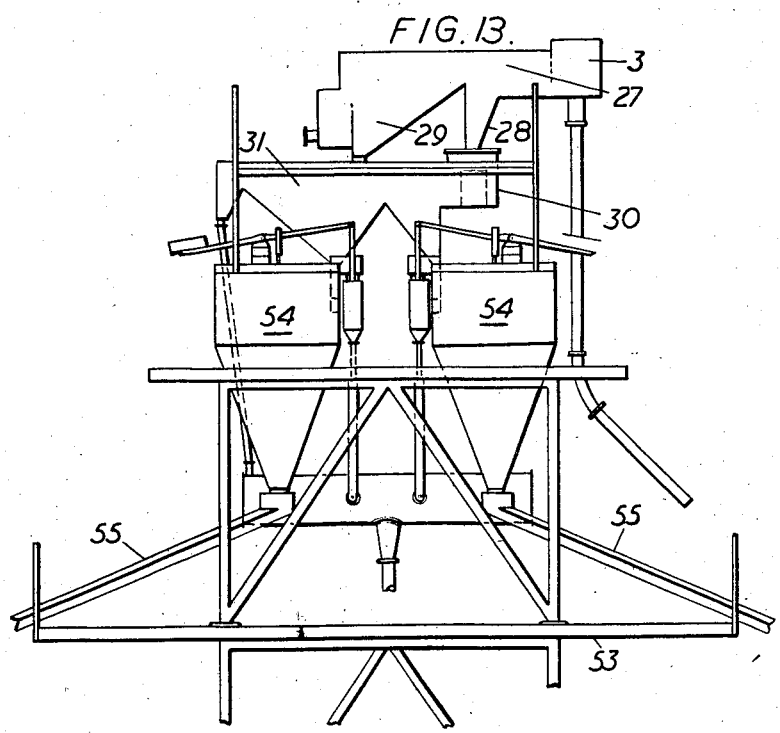
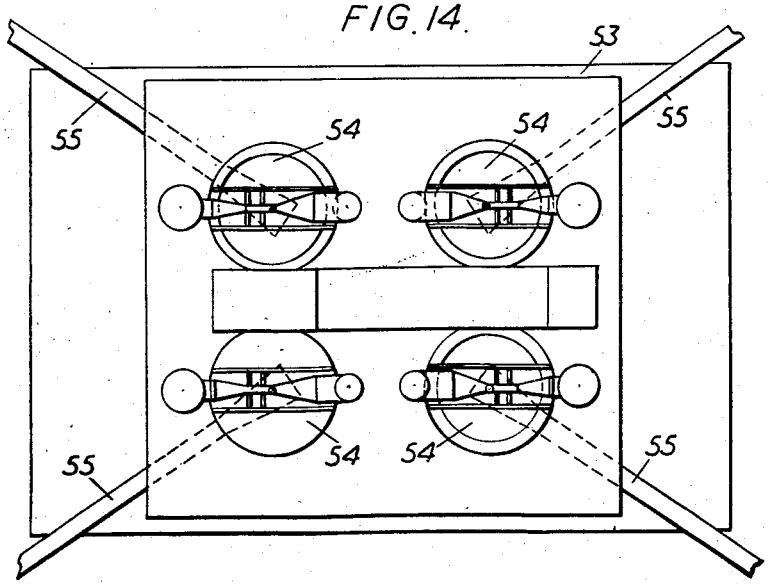
Inventor:
John Gregory Baron Phipps
By:
Baldwin + Wight
his Attorneys

United States Patent Office 2,840,238
Patented June 24, 1958

---

2,840,238

SAND CLASSIFYING APPARATUS

John Degory Baron Phipps, Broadway, England, assignor to Floatex Separations Limited, Broadway, England, a British company Application February 14, 1955, Serial No. 487,918

Claims priority, application Great Britain February 23, 1954

6 Claims. (Cl. 209—156)

The invention relates to classifying apparatus for sand, being of the kind usually termed sand cones.

This application is a continuation-in-part of co-pending application Serial No. 260,531, filed December 7, 1951, and now abandoned.

When large quantities of sand have to be dealt with, a problem which arises is that of the quantity of water in which the sand is suspended. The present invention is directed to an arrangement which keeps to a minimum the size of apparatus required for treating a given quantity of sand per hour. The principal application of the invention is for the treatment of sand as found in nature to produce sand having a suitable composition as aggregate for concrete and fine sand which may be suitable for use in building.

It is an object of the invention to pass the suspension of sand in water in succession over two compartments into which a tank is divided by a partition which extends from a position below the normal water level to the bottom of the tank and to supply the material deposited in the two compartments to two dewatering cones associated with the tank, one receiving its feed from the bottom of one compartment of the tank and the other from the bottom of the other compartment of the tank.

It is a further object of the invention to provide the outlet at the bottom of either or both compartments with a tapered rod or restrictor to vary the area of the orifice and thus to vary the quantity of the suspension discharged from one or both compartments to the respective cone or cones.

A still further object of the invention is to provide as an insertion in the upstream compartment of the tank a substantially horizontal plate at about the top of the tapered outlet, the plate occupying substantially the whole width of the tank and the whole length except for a gap at the downstream end, where the plate is continued in an upward direction to a height comparable with that of the partition or like part and then for a short distance at an upward slope of approximately 30° to the horizontal in the upstream direction.

Yet again it is an object of the invention to subdivide into further grades the suspension of sand in water by means of a separating wall in at least one compartment extending in the flow direction of the suspension, one or two additional cones being provided for dewatering the addition grade or grades.

The usual practice prior to the present invention has been to take the whole of the feed, which may for instance be 60 tons of sand per hour suspended in 700 gallons, 3.15 m.³ or 850 U. S. gallons) of water per minute, to a cone from which 40 tons of sand per hour suitable for concrete was abstracted. The overflow of 700 gallons of water per minute with 20 tons per hour of fine sand in suspension was then treated in one or more other cones, possibly of larger size, to extract the remainder of the sand and reject silt and any other of the finer constituents with the waste water.

The present invention makes it possible to reduce the cost of the cones required for efficient dewatering of the fine sand without the loss of fine sand to waste and also to combine the cones and the tank on one structure small in plan instead of having to use a large tower or two separate towers to carry the two cones. Taking by way of example the same quantities as mentioned above, the whole of the suspension is fed into the tank. One cone then receives 200 to 300 gallons (0.9 to 1.3 m.³) of water per minute and extracts therefrom 40 tons per hour of concrete sand. The second compartment of the tank then passes on to the other cone about 250 gallons (1.15 m.³) per minute of water containing 20 tons per hour of finer sand, the balance passing to the overflow. It is very much easier and requires a much smaller cone to extract the 20 tons per hour of fine sand from 250 gallons of water per minute than from 700, which would be normal practice.

An additional advantage secured is that the outlets of the two cones are brought to the same level instead of having one about 10 feet (3 m.) higher than the other. Moreover the supporting structure for apparatus dealing with the quantities mentioned may be considerably reduced in height as compared with apparatus of the hitherto usual kind, or alternatively stockpiles may be considerably increased in size, since the volume contained in a stockpile is proportional to the cube of its height.

When the horizontal plate mentioned above is added, the partition between the two compartments of the tank is not necessarily vertical. It is more convenient in some cases to make it sloping. If the slope is downwards in the downstream direction, it should not be less than 35° to the horizontal.

The plate may advantageously be adjustable in its longitudinal position to vary the width of the gap according to the composition of the sand being treated and the grading required.

In an alternative form the plate is divided longitudinally into two parts, both of which may be independently adjusted in longitudinal position. A longitudinal division below the divided plate is then required to keep the two different grades of sand separate as may be required. A further feature is conveniently added in such a case. This is a vertical or sloping plate with its top edge in the gap. The arrangement may be that the sand falling in the downstream part of the double gap so formed joins the sand falling in the gap at the end of the other part plate.

By means of the arrangement outlined it is possible not only to ensure more effective classification of the sand with economy in first cost of plant, that is less fine sand in the coarse and less coarse sand in the fine, but by classifying in two stages still better classification may be ensured, or three and even four grades of sand may be obtained. As an example, one particular natural deposit of sand can be separated, as shown by tests, into a coarse sand suitable for filter beds, a medium sand easily complying with British Standard Specification No. 882 for concrete, and a fine sand passing all class A specifications for rendering, plastering and brickwork. The three grades analysed as shown in the following table in percentages:

| Minus | Plus | Filter | Medium | Fine |
|---|---|---|---|---|
| | 3/16″ | 5.6 | 3.7 | 0 |
| 3/16″ | 7 mesh | 18.0 | 11.0 | 0 |
| 7 mesh | 14 mesh | 19.8 | 14.8 | 2.7 |
| 14 mesh | 25 mesh | 24.5 | 27.4 | 17.5 |
| 25 mesh | 52 mesh | 14.7 | 19.8 | 24.9 |
| 52 mesh | 100 mesh | 13.6 | 18.2 | 37.7 |
| 100 mesh | | 3.8 | 5.1 | 17.2 |

Figure 4:
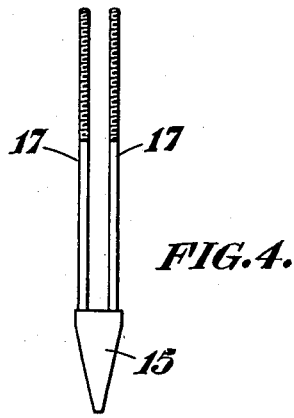

Further features of the invention will appear from the description now to be given of various embodiments illustrated in the accompanying drawings, in which Figure 1 is a diagrammatic elevation of a simple form of plant viewing the tank end on, Figure 2 is a diagrammatic side elevation of the tank, Figure 3 is a plan of the tank with parts of the cones, Figure 4 shows a restrictor viewed in the same direction as Figure 1, Figure 5 is a view corresponding to Figure 2 showing the addition of a horizontal plate.

Figure 9:
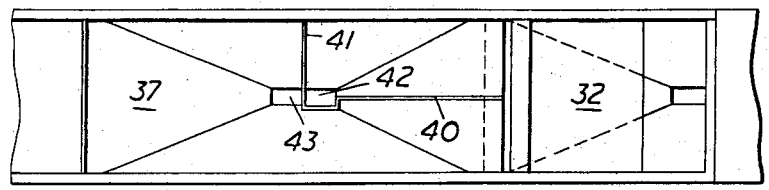
Figure 6:
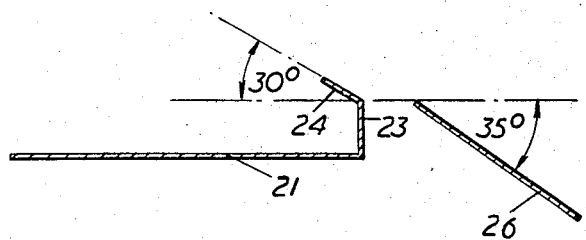
Figure 7:
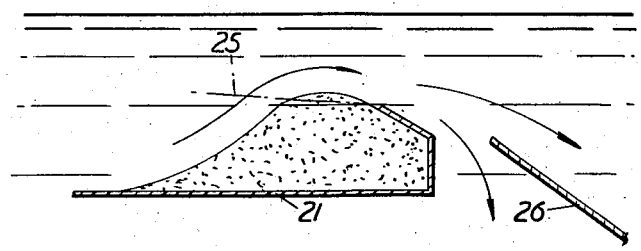
Figure 8B:
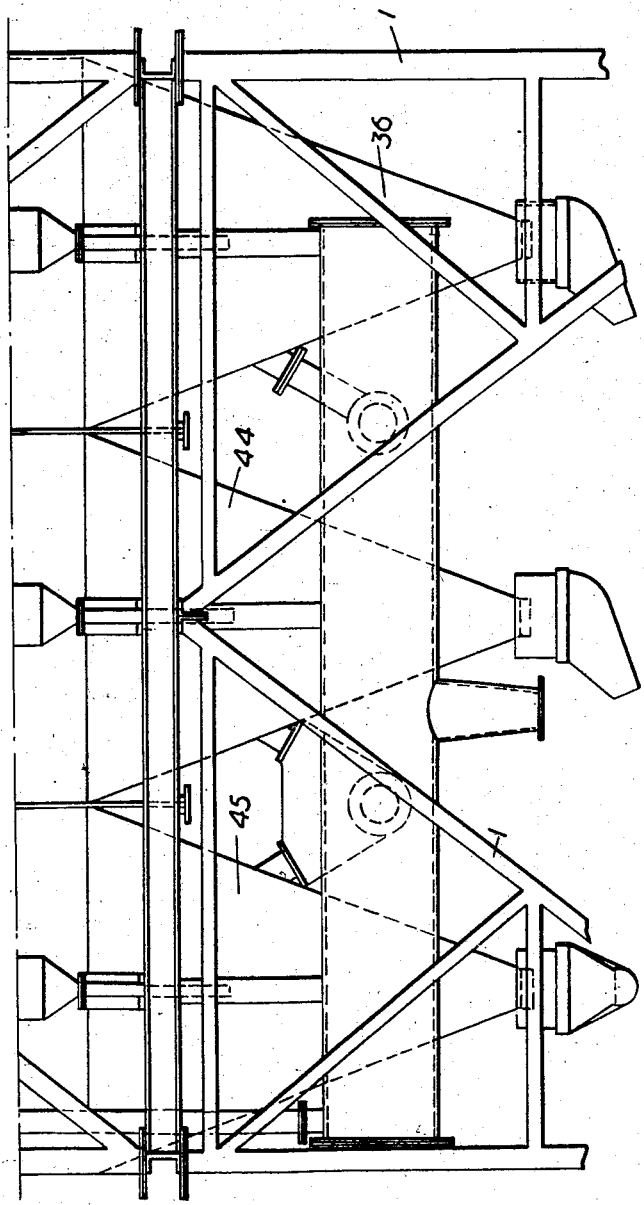

Figure 6 is a sectional elevation of the plate with a part of the partition, in this case set on the slope, Figure 7 is a diagram corresponding to Figure 6 to show the action of the plate, Figures 8A and 8B, together constituting Figure 8, show a side elevation of plant providing classification in two stages, Figure 9 is a plan of the second tank of Figure 8, Figure 10 is a sectional plan of the second tank of Figure 8 to show a modification, Figure 11 is a plan of the same, Figure 12 is a sectional elevation of the tank of Figure 11 taken in section on the line XII—XII, Figure 13 is an elevation of an arrangement with two tanks and four cones, and Figure 14 is a plan of the same.

Referring first to Figures 1 to 4, the plant is mounted on a framework of structural steel, rectangular in plan, of which only some of the upper part is shown in Figures 2 and 3, bearing the reference 1. At its top the framework 1 carries a tank 2. A boiling box 3 is attached to one end of the tank 2 for receiving the suspension of sand and water pumped up from ground level. The tank 2 is divided by a vertical partition 4 into two compartments 5 and 6 with tapered bottoms. An opening 7 in the wall of the boiling box 3 permits the suspension to pass to the first compartment 5. A launder 8 at the remote end of the compartment 6 is provided with a discharge pipe 9 to take away any surplus water and silt after the sand has been deposited in the compartments 5 and 6.

From the bottom of the compartment 5 a curved pipe 10 passes a part of the suspension containing the coarser sand to the tangential entry of a cone 11, in which most of the water is removed in the known manner. Another curved pipe 12 similarly leads from the bottom of compartment 6 to a second cone 13 for the finer sand, the cones being mounted one on each side of the tank 2.

Usually the partition 4 is fixed, though it may be hinged about its base or may be of adjustable height. Similar remarks apply to the weir plate 14 dividing the compartment 6 from the launder 8. The main adjustment of flow to the two cones is, however, effected by throttling the outlets at the bottoms of the two compartments.

A wedge-shaped restrictor 15, shown also in Figure 4, is suspended from a cross channel 16 by two rods 17 so as to be movable up and down in the outlet at the bottom of the compartment 5. The two rods 17 are screw threaded to provide for variations of the degree of throttling, a higher position permitting a greater flow. A similar restrictor 18 but with only one rod is movable in the outlet at the bottom of the compartment 6.

The adjustment of the two restrictors 15 and 18 by varying the relative quantities of suspension passed to the two cones 11 and 13 and to the overflow, provides means for regulating the composition of the two grades of sand discharged from the two cones in regard to quantitative proportions of different ranges of grain size. In general the cone 11 will deliver high grade concrete sand and cone 13 plaster sand. The removal of silt by the water overflowing into the launder 8 increases the dewatering efficiency of the cones 11 and 13.

Figure 5 shows a modification of the tank and corresponds with Figure 2. A horizontal plate 21 is inserted in the compartment 5 at the top of the tapered part extending the full width of the compartment and the whole length except for a gap at the downstream end. Open ended tubes 22 extending above the water level are welded to the plate 21 for the passage of the rods 17 without permitting any suspension to pass between the upper and lower faces of the plate 21 where the rods pass through.

The downstream end of the plate 21 is bent vertically upwards at 23 for 5 inches and then upwards and upstream at 24 at an angle of 30° to the horizontal for a length of 4 inches. The vertical part 23 is spaced away from the partition 4 to leave a gap, which may be up to 6 inches in width. The top of the partition 4 is at about the same vertical height as the bend between the parts 23 and 24. The arrangement is shown separately in Figure 6 with a modification which will be referred to later.

A test was made on a particular grade of sand, passing 70 tons per hour through the plant. About 20 tons per hour of fine sand passed over the gap into the downstream compartment, while the remaining 50 tons of coarse sand fell through the gap. In operation a pile of coarse sand was deposited as shown in Figure 7 behind the upturned end of the plate 21, and on a cessation of feed only the small quantity of sand above the sloping chain-dotted line 25 was washed down the gap. The importance of the part 24 of the plate is that in such an event it prevents any coarse sand from being washed over the gap, where it might spoil the fine sand.

It has been found advantageous to modify the partition 4 by setting it at such a slope that it is in line with adjacent lower side of the compartment 6, but in that case the slope should not be less than 35° to the horizontal. The partition so modified is shown at 26 in Figures 6 and 7.

A description will now be given of plant for obtaining an improved separation, particularly where the new sand contains a large proportion of fine constituents. The plant comprises two tanks similar to that of Figure 5 and three dewatering cones and is shown in Figure 8. A first tank 27 is mounted on top of the supporting framework 1 and is combined with a boiling box 3 to receive the incoming suspension. The upstream compartment 28 contains a plate 21 as above described, and the upstream wall of the downstream compartment 29 is extended at 26 to constitute the partition between the compartments.

The suspension falling into the compartment 28 is discharged into a second boiling box 30. To this is added the overflow from the tank 27 by a pipe 61 to ensure a sufficiency of water. The suspension from the boiling box flows into a second two-compartment tank 31 in which the first compartment 32 has a plate 33 similar to the plate 21, except that the vertical part 23 of that plate is here made sloping at 34 to clear the downstream side of the lower part of the compartment 32. Normally the gap here will be wider than shown in the figure. The sand falling into the compartment 32 is the coarsest grade and is discharged at 35 into a dewatering cone 36, while any silt which may have been contained in the feed through the pipe 61 continues its travel to the second compartment 37, finding its way over the end partition 38 to be discharged with the waste water at 39.

The fine sand passing over the gap contains only a small percentage of +25 mesh and is divided into two parts by a separating wall 40 as shown in Figure 9. This wall extends from the upstream side of the compartment 37 in the downstream direction and is carried by bends round a first outlet 42 and then transversely across at 41 to the side of the compartment. A part of the suspension flows over the top of the wall 41 and flows out through a second discharge 43. Both discharges 42 and 43 carry fine sand, which passes to two dewatering cones 44 and 45. If only one two compartment tank were provided for a feed of the kind referred to, the gap would have to be set very small to ensure a satisfactory quality of concrete sand, and then many coarse grains might jump the gap and spoil the fine sand.

A modification of the arrangement just described is shown in Figures 10, 11 and 12 as applied to the tank 31 of Figure 8. This is intended for the case in which the feed contains a considerable proportion of coarse sand and an exceptionally coarse grade is required for filter beds.

In Figure 10, which is taken below the plate similar to 21, the dividing wall 40, 41 is shown again, but the other way round, and the two outlets 42 and 43 are provided as before. The plate similar to 21 is here divided into two parts 46 and 47 each separately adjustable in the flow direction to vary the width of the gap over which the suspension flows. At the side of the gap corresponding to the extension 41 of the separating wall, a further dividing plate 48 is inserted to separate the suspension flowing over the gap into two parts, of which the coarser leaves by a discharge 49 and the finer by a discharge 50. The finer suspension passing over the separating wall flows into the second compartment 51 and is mixed with the suspension flowing over the gap beyond the plate 47. This is the finest suspension and leaves by a discharge 52.

Reverting to Figure 8, it would be possible if required to produce two grades of coarse sand by dividing the horizontal plate 33 longitudinally as shown in Figures 11 and 12 and setting them to different widths of gap.

Since it is advantageous in many cases to produce three grades of sand, and there may be variations in the composition of the original sand, a modified arrangement shown in Figures 13 and 14 may be adopted. In this case there are two classifying tanks and four dewatering cones, but the great advantage is achieved that the cones may be set up on a simplified structure 53 at the four corners of a square in plan. The three grades of sand are provided by mixing two of the four grades actually separated in the apparatus. The suspension is pumped into a boiling box 3 where it is separated in a tank 27 generally as described above. The fraction from the first compartment 28 is discharged into a second boiling box 30 at the upstream end of a second two-compartment tank 31, where it is again divided into two fractions discharged into dewatering cones 54.

The suspension passing into the second compartment 29 of the first tank is divided into two fractions by arrangements similar to those shown in Figures 10, 11 and 12, and the fractions finally obtained pass through four dewatering cones 54, the dewatered sand passing out radially by chutes 55 to form separate piles. The chutes can be pivoted so that any two adjacent ones may together feed a common stock pile.

What I claim is:

1. Classifying apparatus for sand comprising a tank to receive the sand suspended in water, a partition in the form of a weir extending from below the normal water level to the bottom of the tank to divide said tank into two compartments, inlet means for the sand and water suspension to one compartment at a position remote from the partition, an overflow launder at that end of the other compartment which is remote from the partition, a weir between the latter compartment and the launder, a substantially horizontal plate in the upstream compartment occupying substantially the whole width of the tank and the whole length of such compartment except for a gap at the downstream end, an upward extension of said plate at the downstream end thereof terminating approximately at the same level as the top of said partition, and a further continuation of said plate extending from said level upwardly at an angle between the vertical and horizontal in the upstream direction.

2. Classifying apparatus as defined in claim 1, in which the plate is adjustable in the flow direction to vary the width of the gap.

3. Classifying apparatus as defined in claim 1, in which the plate is subdivided lengthwise into two parts independently adjustable in the flow direction to provide two gaps of variable width.

4. Classifying apparatus as defined in claim 3, comprising also separate outlets for the material falling through the two gaps and a dividing wall below the plate to ensure that the material falling through each gap passes to its respective outlet.

5. Classifying apparatus as defined in claim 3, including also a separating plate extending upwards into one of the gaps to further separate the material falling through the said gap into a coarser and a finer fraction.

6. Classifying apparatus for sand comprising a tank to receive the sand suspended in water, a partition in the form of a weir extending from below the normal water level to the bottom of the tank to divide the tank into two compartments, inlet means for the sand and water suspension to one compartment at a position remote from the partition, an overflow launder at that end of the other compartment which is remote from the partition, a weir between the latter compartment and the launder, a substantially horizontal plate in the upstream compartment occupying substantially the whole width of the tank and the whole length of such compartment except for a gap at the downstream end, an upward extension of the plate at the downstream end thereof terminating approximately at the same level as the top of the partition, a further continuation of the plate extending from the said level at an upward slope of about 30° to the horizontal in the upstream direction, two dewatering cones, outlet means from the bottom of each compartment of the tank, and connections between the said outlet means and the two cones respectively.

References Cited in the file of this patent

UNITED STATES PATENTS

| 1,696,767 | Hoyais | Dec. 25, 1928 |
| 1,740,005 | Crawley | Dec. 17, 1929 |
| 2,369,863 | Sevey | Feb. 20, 1945 |
| 2,598,409 | Meckenstock | May 27, 1952 |

FOREIGN PATENTS

| 19,606 | Switzerland | June 17, 1899 |

OTHER REFERENCES

Taggart: Handbook of Mineral Dressing © 1945 by Wiley and Sons, N. Y. C., section 8 pages 35 and 36 and section 15, page .02.